United States Patent Office 3,112,320
Patented Nov. 26, 1963

3,112,320
STABILIZED TRIETHYLENE DIAMINE
Adalbert Farkas, Media, Pa., assignor to Air Products and Chemicals, Inc., a corporation of Delaware
No Drawing. Filed Aug. 2, 1961, Ser. No. 128,680
5 Claims. (Cl. 260—268)

The present invention relates to stabilization of organic compounds subject to deterioration on storage and is particularly concerned with stabilization of triethylene diamine, also known as 1,4-diazabicyclo (2.2.2) octane.

The principal use of triethylene diamine as a catalyst in production of polyurethanes has been widely described in technical literature; see for example: Erner et al., Modern Plastics, February 1960, p. 107; Farkas et al., Ind. and Eng. Chem., vol. 51, p. 1299, October 1959; J. Chem. and Eng. Data, vol. 4, p. 334, 1959; and in U.S. Patent Number 2,939,851, issued June 7, 1960. Various methods are known for preparation of this compound, among which are those described in U.S. Patents 2,937,176 and 2,985,658.

It has been noted that when the commercial triethylene diamine product is stored for a period of several months, and at times in shorter periods, it shows the tendency to become discolored and/or to agglomerate to a cake form. These tendencies were observed even though the triethylene diamine was kept in unopened containers and was protected from direct actinic effects by storage in opaque materials or in amber colored glass. Various means have been attempted to overcome these objectionable features by addition of various types of expected stabilizing agents without desired success.

It has now been found that triethylene diamine can be stabilized or preserved and its shelf-life increased in marked degree by the incorporation therewith of a small amount of an alkali metal salt of an oxidizable sulfoxy acid particularly those in which sulfur is tetravalent, as in sodium metabisulfite. In practice of the invention, for best results, care should be exercised in obtaining good admixing or blending of the metabisulfite with the triethylene diamine.

The salient effect of the metabisulfite addition is observed with amounts as low as 0.1% thereof by weight of the triethylene diamine, but for practical purposes affording a wide safety factor it is recommended that the preservative be added in amounts of about 0.5% to 2% by weight. Amounts in excess of about 5% by weight are best avoided in triethylene diamine compositions intended for use in polyurethane catalysis because of possible effects on solubility of the activator composition or untoward effects on the ultimate polyurethane products.

The preferred stabilizing agent is sodium metabisulfite ($Na_2S_2O_5$) also known as sodium pyrosulfite. Also suitable for this use is sodium bisulfite ($NaHSO_3$); commercial sodium bisulfite is composed chiefly of sodium metabisulfite. The corresponding potassium salts ($K_2S_2O_5$ and $KHSO_3$) can also be used as well as the available ammonium salts such as ammonium bisulfite. Among the other alkali salts of oxidizable sulfur-oxygen acids which evidence a stabilizing effect, but not necessarily in equal degree to the bisulfites and metabisulfites, there are included anhydrous sodium and potassium thiosulfates ($K_2S_2O_3$), wherein each of the sulfur atoms may be regarded as having a positive valence of 2. The term "alkali salt" as is used in the foregoing description as including the alkali metal and ammonium salts.

It has been demonstrated that when the stabilizing agent, such as sodium metabisulfite, is admixed in dry form with the triethylene diamine in the proportions suggested above, the latter maintains its original white color over prolonged periods of storage and the powder product remains free-running (does not cake). These compositions dissolve in water to form clear solutions and the presence of the stabilizing agent has shown no adverse effect on the behaviour of the triethylene diamine composition when used as catalyst in polyurethane formulations.

Example I

A sample of commercial triethylene diamine in powder form was thoroughly admixed with 2% sodium metabisulfite and the mixture stored in a glass container over a four month period. There was similarly stored as a control, another sample of triethylene diamine from the same plant production lot free of added stabilizer. The control sample, without the stabilizer, had turned off-color by the appearance of a yellowish cast. The sample containing the metabisulfite retained a good white color.

Example II

In another series of experiments the sodium metabisulfite was admixed with the dry triethylene diamine in proportions of 1 and 2% by weight respectively. Thorough admixture was obtained by 1 to 2 hour mixing of the compositions in their glass containers on a ball-mill roller. These containers were stored together with untreated controls similarly packaged, being exposed to daylight but not to direct sunlight. Visual inspection showed a slight yellowish tinge had developed in the untreated samples in 2 to 3 weeks, while both of the treated samples remained white. The metabisulfite containing samples, moreover, gave a free-flowing powder when shaken slightly while the control samples formed cakes that could not be converted to powdery material even by violent agitation. Inspection of the treated samples after an additional month's storage revealed that the white color remained and that these samples still showed free-flowing characteristics.

Example III

Samples of commercial triethylene diamine product were made up by blending respectively with 0.5%, 1% and 2% by weight of sodium metabisulfite. A portion of each blend was dissolved in water (100 grams per liter). Clear solutions were obtained in each instance, showing that the additive did not interfere with water solubility.

The sample containing 2% metabisulfite was used in the preparation of flexible polyurethane foams on a commercial foam machine and companion runs made with untreated triethylene diamine catalyst for comparison. No adverse effect of the sodium metabisulfite was observed. The polyurethane mix had the following formulations:

Polypropylene glycol (4000 M.W.; OH=28) ____ 100
Tolylene diisocyanate_____ 45.8
Water _____ 4.0
Water-soluble organo-silicone polymer (L–520) ___ 1.0
Tin octoate_____ 0.57
Triethylene diamine (containing 2% $Na_2S_2O_5$) ____ 0.15

To test the compatibility of the metabisulfite-stabilized triethylene diamine in formulations for production of rigid polyurethane foams, the solubility of such mixtures in polyol solvents was tested. Three samples of five parts by weight of stabilized triethylene diamine, containing respectively 0.5, 1.0, and 2.0% sodium metabisulfite, were dissolved in 10 parts hexane triol. All of the triethylene diamine went into solution on gentle heating. In the case of the samples containing highest concentration of sodium metabisulfite a slight cloudiness was observed. This slight cloudiness is not believed to interfere with the effectiveness of the stabilized composition in polyurethane formulations.

The blending of the triethylene diamine with the stabilizing agent may be facilitated by slurrying in an inert non-solvent liquid, and subsequent removal of the liquid. Since volatile paraffin hydrocarbon liquids such as pentane, are employed in purification (washing) of triethylene diamine in the usual manufacturing operation, it is convenient to add the stabilizing agent to the slurry or suspension of triethylene diamine in the hydrocarbon liquid, and after thorough blending of the suspended solids, the liquid can be readily removed by evaporation leaving the stabilized powder.

*Example IV*

To a mixing vessel provided with agitators there was charged 150 parts by weight triethylene diamine, 3 parts sodium metabisulfite and about 150 parts pentane. The contents were agitated for several hours and the pentane removed by filtration of the bulk and subsequent evaporation of the remainder. The dried triethylene diamine containing the added stabilizing agent was packaged in commercial type fibre drums for several months. Upon examination of the drum contents at the end of this period it was found that the triethylene diamine containing the stabilizer had good white color and was free-flowing. A control sample similarly packed but without stabilizer showed distinct yellowing and severe caking.

Obviously many modifications and variations of the invention as hereinbefore set forth may be made without departing from the spirit and scope thereof, and therefore only such limitations should be imposed as are indicated in the appended claims.

What is claimed is:

1. A stabilized free-flowing catalyst composition consisting essentially of triethylene diamine and containing as stabilizing agent therein 0.5 to 2.0% by weight of salt of an oxidizable sulfoxy acid, selected from the group consisting of alkali metal and ammonium metabisulfite, bisulfite and thiosulfate.

2. A stabilized free-flowing composition consisting essentially of triethylene diamine and a minor quantity of salt of an oxidizable sulfoxy acid, selected from the group consisting of alkali metal and ammonium metabisulfite, bisulfite, and thiosulfate associated therewith.

3. A composition as defined in claim 2 wherein said salt is an alkali metal salt in which sulfur is tetravalent.

4. A composition as defined in claim 2 wherein said salt is an alkali metal bisulfite and constitutes at least 0.1% by weight of the triethylene diamine.

5. A stabilized catalyst composition for use in polyurethane formulations, which catalyst composition consists essentially of triethylene diamine thoroughly admixed with 0.5 to 2% by weight of sodium metabisulfite.

No references cited.